(12) United States Patent
St. Denis et al.

(10) Patent No.: US 6,490,592 B1
(45) Date of Patent: Dec. 3, 2002

(54) METHOD OF AND APPARATUS FOR GENERATING A TREE DATA STRUCTURE SUPPORTING LONGEST MATCH LOOKUP

(75) Inventors: Bernard B. St. Denis, Nepean (CA); Yuri Tsier, Kanata (CA); Reshad R. Rahman, Ottawa (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/475,722

(22) Filed: Dec. 30, 1999

(51) Int. Cl.[7] ............................................. G06F 17/30

(52) U.S. Cl. ...................................................... 707/102

(58) Field of Search ................................ 395/600, 612; 709/213, 247; 707/102

(56) References Cited

U.S. PATENT DOCUMENTS

| | | | | | |
|---|---|---|---|---|---|
| 5,202,986 A | * | 4/1993 | Nickel | ........................ | 395/600 |
| 5,644,763 A | * | 7/1997 | Roy | ............................. | 395/612 |
| 5,987,506 A | * | 11/1999 | Carter et al. | ................ | 709/213 |
| 6,067,574 A | * | 5/2000 | Tzeng | ........................ | 709/247 |
| 6,208,993 B1 | * | 3/2001 | Shadmon | .................... | 707/102 |

* cited by examiner

*Primary Examiner*—Wayne Amsbury
*Assistant Examiner*—Cam-Linh Nguyen
(74) *Attorney, Agent, or Firm*—Gibbon, Del Deo, Dolan, Griffinger & Vecchione

(57) ABSTRACT

A multi-way tree data structure is provided that supports a longest match lookup. Data elements stored therein that have no overlapping prefixes are arranged in a standard B-tree arrangement. Data elements that have overlapping prefixes are arranged within the tree such that a respective one of these prefixes contains the prefixes of all such data elements that succeed it.

137 Claims, 6 Drawing Sheets

Legend
→ Pointer to the next record
→ NULL pointer

METHOD OF AND APPARATUS FOR GENERATING A TREE DATA STRUCTURE SUPPORTING LONGEST MATCH LOOKUP

BACKGROUND OF THE INVENTION

The present invention is directed to data structures used for data lookups and, more particularly, to a tree data structure for longest match lookups that is suitable for Internet Protocol network routing applications.

Presently, a switching platform that is seeking to route to a selected IP address looks up the longest match to the desired IP address from IP addresses stored or group of IP addresses in a data table. The table of IP addresses is typically arranged as a digital binary tree structure, namely a data structure having two branches that extend from each record to form respective binary sub-trees. The binary tree structure is traversed in a known manner until the longest match to the desired IP address is located.

The binary tree structure may not efficiently use memory or may not efficiently use processing time. When a large number of IP addresses are stored in the table, the resulting binary tree structure can be of great height and thus require significant time to search the binary tree. As a result, the time required to route to a desired IP address increases significantly with the number of IP addresses stored in the binary tree. Also, two pointers are stored for each IP address, thereby increasing the size of the memory required with each value stored.

Alternatively, a balanced multi-way tree (B-tree) provides a tree of lower height and can be searched more quickly. Specifically, a B-tree is comprised of multiple records where each record includes one or more nodes with each node comprising a key and associated data. Each record of the multi-way tree has M branches, where $M \geq 2$. Optimally, the multi-way tree is kept balanced, namely all the leaves of the M tree are kept on the same level, as new IP addresses are added and existing IP addresses are removed. The tree is kept balanced to prevent portions of the tree from being significantly deeper than other portions so that all branches are traversed in substantially the same time.

However, a B-tree is not well suited for a longest match lookup. When the B-tree includes one or more IP addresses whose network prefix, namely the leftmost part of the IP address, is a subset of the network prefix of another IP address, the search may traverse a branch of the tree that contains an IP address that does not include the longest match to the desired IP address and thus the longest match is not found.

It is therefore desirable to provide a multi-way tree structure that provides the advantages of a B-tree and which always enables the longest match to a desired IP address to be located.

SUMMARY OF THE INVENTION

The present invention provides a multi-way tree data structure which supports a longest match lookup and wherein data elements stored therein that have no overlapping prefixes are arranged in a standard B-tree arrangement and data elements stored therein that have overlapping prefixes are arranged within the tree such that the prefix of such a data element contains the prefixes of all such data elements that succeed it.

In accordance with the invention, a new data element is inserted into a data structure comprised of a plurality of records that includes at least a root record. Each of the records includes at least one node and includes at least one pointer that points to another of the records or to a null value. The nodes are each capable of storing a respective data element, and each of the data elements and the new data element include a prefix that represents at least one address value and associated data. The prefix includes an address portion and a prefix length portion which defines the number of bits in the prefix. At least a portion of the data structure is arranged substantially as a balanced tree. A node in a respective one of the records having a prefix that is identical to the prefix of the new data element is located, and associated data stored in the node of one of the records is replaced with the associated data of the new data element.

According to another aspect of the invention, a node in a respective record having a prefix that is contained in the prefix of the new data element and that is closest to the root record is located. When the respective record is included in a linked structure that is within the data structure and that is external to but linked to the balanced tree, the new data element is inserted into the linked structure.

According to yet another aspect of the invention, a node in a respective record having a prefix that is contained in the prefix of the new data element and that is closest to the root record is located. When the respective record is included in the balanced tree but is pointed to by a pointer extending from a linked structure that is within the data structure and that is external to the balanced tree, the new data element is inserted into the linked structure.

According to a further aspect of the invention, a node in a respective record having a prefix that is contained in the prefix of the new data element and that is closest to the root record is located. When the respective record is included in the balanced tree and is not pointed to by a pointer extending from a linked structure that is within the data structure and that is external to the balanced tree, a new linked structure is inserted at a location within the data structure that immediately precedes the respective record. A pointer that previously pointed to the respective record now point to a first record of the new linked structure, and a pointer extending from a location within the linked structure that is closest to the root record and a pointer extending from a location within the linked structure that is furthest from the root record each point to the respective record. The new data element is inserted into a node within the new linked structure nearest to the root node.

According to a still further aspect of the invention, a node of a leaf record having a prefix that contains the prefix of the new data element is located. A data element stored in the node of the leaf record is replaced by the new data element, and then the data element previously stored in the node of the leaf record is inserted into the data structure as described above.

According to yet a further aspect of the invention, a data element is deleted from the data structure. A node in a respective record having the data element is located. When the respective record is included in a linked structure that is within the structure and that is external to but linked to the balanced tree, the data element is removed from the linked structure.

According to yet a still further aspect of the invention, a data element is deleted from the data structure. A node in a respective record having the data element is located. When the respective record is not included in a linked structure, any linked structures within the data structure that have a pointer pointing to the respective record is removed so that a pointer that previously pointed to the linked structure now points to the respective record. The data element is removed from the respective record and, the balanced tree portion of the data structure is rearranged. Any data elements previously stored in the linked structure are reinserted into the data structure, one data element at a time.

Further, according to the invention, a data element is searched for in the data structure. A respective node that stores a data element having a prefix that is a best match to the prefix of the data element is located. The best match is a prefix that represents at least an address value that includes the address portion of the data element and has a maximum length of any other prefixes stored in the data structure that represent one or more address values that includes the address portion of the data element.

Additionally, according to the invention, a data element is searched for in a data structure. A current record is defined to be the root record, and a best match node is defined to be a default node. Starting from a node in the current record that is closest to the root node, a prefix stored at each node in the current record is compared to the prefix of the data element. When a prefix stored at a respective node in the current record contains the prefix of the data element and when a prefix length stored at the respective node in the current record is greater than the prefix stored at the best match node, the best match node is redefined to be the respective node in the current record. Starting from the node in the current record that is closest to the root node, a prefix stored at each node in the current record is compared to the prefix of the data element until a value of the prefix stored at a respective node in the current record exceeds or is equal to a value of the prefix of the data element, and then a record pointed to by a pointer corresponding to the respective node is defined to be the current record, or until the value of the prefix of the data element exceeds a value of a node of the current record that is furthest from the root node, and then a record pointed to by a pointer from the furthest node is defined as the current record. The search is repeated until the current record is a root record or until the prefix of the data element is identical to the prefix stored at the respective node.

Other features and advantages of the present invention will become apparent from the following detailed description of the invention with reference to the accompanying drawings.

BRIEF DESCRIPTION OF THE DRAWINGS

The invention will now be described in greater detail in the following detailed description with reference to the drawings in which.

DETAILED DESCRIPTION OF THE INVENTION

Figure 1:
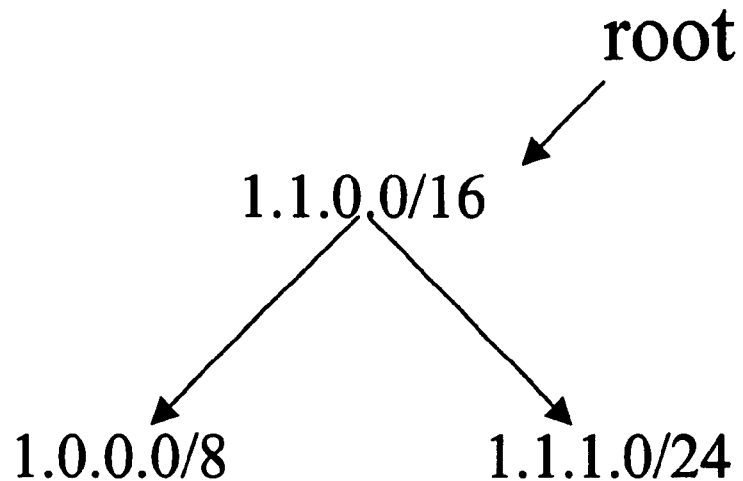
FIG. 1 shows a portion of a known tree data structure in which IP addresses having overlapping prefixes are arranged in a manner that does not support a longest match lookup.

The present invention provides a method of forming a multi-way tree data structure for storing data elements that supports a longest match lookup even when the tree structure includes data elements that have overlapping prefixes.

Typically, each data element includes a prefix that represents one or more addresses, such as IP addresses, and may include associated data. Each prefix is arranged in a format as follows:

Address Portion/Prefix Length.

As an example, the prefix 1.1.1.0/24 contains all the addresses whose first 24 bits have the value 1.1.1, where each numeral is represented by eight bits. Namely, the prefix to 1.1.1.0/24 contains all the addresses between 1.1.1.0 and 1.1.1.255. Further, the address 1.2.0.0 is of greater value than the address 1.1.255.255.

The longest match in a tree data structure for an address X is the data element having a prefix that (1) contains the address X and (2) has the maximum prefix length among all prefixes that contain the address X.

FIG. 1 illustrates an example in which three data elements are arranged in a known manner to form a balanced tree and which does not support a longest match lookup. The three data elements have respective overlapping prefixes, 1.1.0.0/16, 1.0.0.0/8 and 1.1.1.0/24, i.e., the prefix 1.0.0.0/8 contains all the addresses whose first 8 bits have the value 1, the prefix 1.1.0.0/16 contains all the addresses whose first 16 bits have the value 1.1, and the prefix 1.1.1.0/24 contains all the addresses whose first 24 bits have the value 1.1.1. An attempt to traverse the tree to find the longest match for the address 1.2.2.2, namely the prefix 1.0.0.0/8, will travel from the root 1.1.0.0/16 to the prefix 1.1.1.0/24 and not to the best match prefix 1.0.0.0/8.

Figure 2:
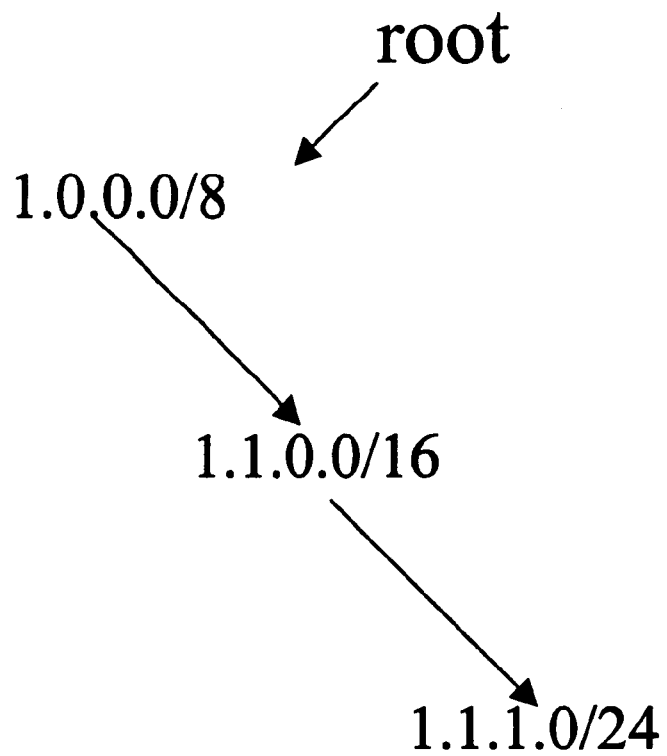
FIG. 2 shows a portion of a tree data structure according to the invention in which prefixes having overlapping portions are arranged in a manner that supports a longest match lookup.

FIG. 2 illustrates an unbalanced tree structure containing the same three prefixes shown in FIG. 1 but in which the prefixes are arranged to support a longest match lookup in accordance with the invention. In this arrangement, a search for the longest match for the address having prefix 1.2.2.2 will locate the longest match prefix 1.0.0.0/8.

In accordance with the invention, a tree data structure, such as is shown in FIG. 2, may include addresses having respective overlapping prefixes R[1], . . . , R[n], wherein the prefix R[i] contains the prefix R[j] for any i<j. The tree is arranged such that prefix R[i] is located closer to the root of the tree than prefix R[j], i.e. the number of nodes on a path traversed from the root to the record having the prefix R[i] is less than the number of records traversed on a path from the root node to the node containing the prefix R[j]. As a result, the longest match will be located when the tree is traversed.

Figure 3:
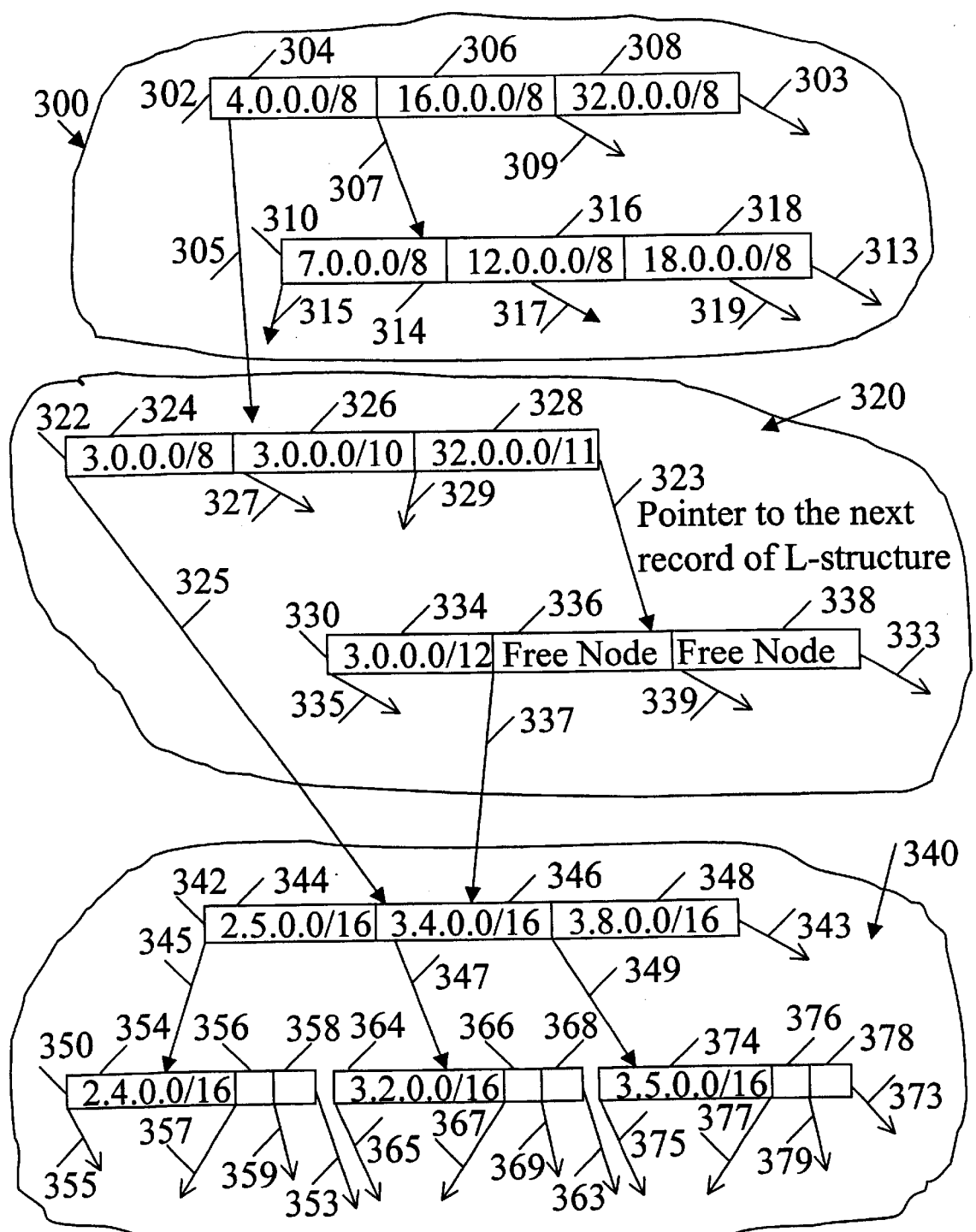
FIG. 3 shows an example of a tree data structure according to the invention in which IP addresses having non-overlapping prefixes are arranged in a B-tree and in which IP addresses having overlapping prefixes form a plurality of L-structures which are inserted within the B-tree in a manner that supports a longest match search.

FIG. 3 illustrates an example of a multi-way data tree structure formed in accordance with the invention. Only the prefix (including the prefix length portion) of each of the data elements is shown. The tree data structure includes multiple records. In this example, known as a quaternary tree or Q-tree, each record includes three nodes (R.N[0], R.N[1], and R.N[2]) and four pointers (R.subtree[0], . . . , R.subtree[3]), though structures with more or less than three nodes and more or less than four pointers are also possible. The pointers point to other records that define sub-trees of the tree structure of the invention. Each of the nodes R.N[0], R.N[1], and R.N[2] includes a prefix (N.Prefix), a prefix length portion of the prefix (N.PrefixLength) and, possibly, associated data.

The tree data structure of the invention includes the following: (1) a known B-tree structure for storing data having non-overlapping prefixes and (2) additional structures for storing data having overlapping prefixes, if any such data are present. The additional structures are similar to a linked list and are therefore known as L-structures. In FIG. 3, the portions 300 and 340 comprise the B-tree into which a L-structure 320 is inserted.

Each L-structure comprises a super-set, namely a set in which at least one prefix contains one or more of the other prefixes. As an example, in the L-structure 200 in FIG. 3, the super-set 3.0.0.0/8 at node 324 contains all prefixes whose first 8 bits represent the value 3, i.e. the prefix 3.0.0.0/10 at node 326, the prefix 3.0.0.0/11 at node 328 and the prefix 3.0.0.0/12 at node 334. Advantageously, the tree data structure of the invention is formed by merging a one or more L-structures into a known B-tree structure, and the B-tree and each of the L-structures are each formed independently.

Each of the L-structures is a collection of prefixes R[1], R[2], . . . , R[n] that has the following properties: (1) Prefix R[i] contains the prefix R[j] and is closer to the root record than the prefix R[j] for any i<j. (2) Any prefix R[i] contains one or more prefixes of the B-tree structure. As an example, in FIG. 3, the prefix 3.0.0.0/8 contains the prefixes 3.2.0.0/16, 3.4.0.0/16 and 3.5.0.0/16. (3) All of the records of an L-structure are full except, possibly, for the last record. (4) The rightmost pointer of a record links to the next record of the L-structure. As an example, in FIG. 3, the pointer 323 of the record 322 links to the next record 330. However, the rightmost pointer of the last record of the L-structure does not point to another record of the L-structure, e.g. the rightmost pointer 333 of the record 330. (5) A pointer that originates from the final record of the L-structure points to a record S that is also the root of a sub-tree of the B-tree. For example, the pointer 337 points to the record 342 that is also the root of a sub-tree 340. The root of the sub-tree includes all subsets of the prefix R[n] as well as non-subsets of prefix R[n]. (6) The record that was the parent record to the record S prior to the insertion of the L-structure now includes a pointer that points to the first record of the L-structure. For example, the record 302, which is the parent of record 342 prior to insertion of the L-structure 320, includes a pointer that links to the first record 322 of the L-structure 320. (7) The first pointer of the L-structure also points to the record S. As an example, the first pointer 325 of the first record 322 of the L-structure 320 also points to the record 342. This arrangement allows for the searching of prefixes that have address portions of lesser value than that of the prefix R[1] stored at node 324 of record 322. Advantageously, the pointer 325 causes the tree to appear to have a graph structure but still permits only one search path for any IP address.

The longest match to an address is located within the tree data structure in the following manner: (1) Starting at the root record of the tree structure, the current record is initially defined as the root record, and the BestMatchNode is initially set to a default node. (2) Starting from the leftmost node in the current record, the prefix stored at each node in the current record is compared to the address to be searched. When the prefix stored at one of the nodes contains the address to be searched and the prefix length stored at that node is greater than the prefix stored at the current BestMatchNode, then the BestMatchNode is redefined to be that node. (3) Then, again starting from the leftmost node of the current record, the address to be searched is compared to the prefix stored at each of the nodes in the current record. When the address portion of the prefix stored at one of the nodes exceeds or is equal to the address to be searched, the record pointed to by the pointer preceded by this node is defined to be the new current record, and no further comparisons are made. When the address to be searched exceeds the address portion of the rightmost node, the record pointed to by the rightmost pointer is defined as the new current record. (4) Steps (2) and (3) are then repeated until a leaf of the tree is reached, namely when the new current record is a null record or is non-existent, or when an exact match is found.

As an example, to locate the best match to the address 3.2.2.2 in the tree structure shown in FIG. 3, first the current record is initially defined as the root record 302, and the BestMatchNode is initially set to a default node, such as 0.0.0.0/0. Then, the address 3.2.2.2 is compared to the prefixes at the nodes 304, 306 and 308. Because none of the prefixes in the record 302 contains the address 3.2.2.2, the BestMatchNode remains the default node.

Then, the address 3.2.2.2 is again compared to the prefix at the nodes 304. Because the address 4.0.0.0 is greater than the address 3.2.2.2, the new current record is the record pointed to by the pointer preceding the node 304, namely record 322, which is pointed to by pointer 305.

Thereafter, the address 3.2.2.2 is compared to the prefixes at the nodes 324, 326 and 328. The prefix at node 324 is first determined to be the new BestMatchNode because the prefix 3.0.0.0/8 contains the address 3.2.2.2. Subsequently, the node 326 is next the new BestMatchNode, and then node 328 is the new BestMatchNode. Then, the address 3.2.2.2. is compared to the address portion of the prefixes in the nodes 324, 326 and 328. Because the address 3.2.2.2 exceeds the address portion of each of these prefixes, the new current record is the record pointed to by the rightmost pointer from record 322, namely record 330 which is pointed to by pointer 323. In this record, node 334, which stores the data element 3.0.0.0/12, is the new BestMatchNode.

Thereafter, the address 3.2.2.2. is compared to the address portion of the prefix at the node 334, which is of lesser address than the address 3.2.2.2, and the prefix at the node 336, which is a free node. By definition, a free node is always of greater value than the address to be searched, and therefore the new current record is the record pointed to by the pointer located between records 334 and 336, namely record 342 which is pointed to by pointer 337. In this record, none of the nodes contains the address 3.2.2.2, so the BestMatchNode remains node 334.

The process is then repeated to find the new current record at record 360 and the new BestMatchNode at node 362. Because pointer 365 is a null pointer, i.e. record 360 is a leaf record, no further records are traversed and the best match is the data element 3.2.0.0/16 at node 362.

Similarly, a search for the best match to the address 2.5.10.10 traverses through the nodes in the records 302, 322, 342 and 360 to find that the prefix 2.5.0.0/16 at the node 344 of the record 342 is the best match.

A new data element is inserted into the tree data structure of the invention in the following manner:

First, the tree data structure is searched in a manner similar to that of a search for the best match node, except that step (2) is omitted.

If, while the search is carried out, a node having a prefix identical to the prefix P of the new data element is found, then the associated data, if any, of the new data element is substituted for any the associated data presently being stored at that node.

Alternatively, if while the search is carried out, the prefix P of the new data element is found to be a superset of the prefixes stored at one or more nodes, i.e. the prefix P of the new data element contains each of the prefixes stored at these nodes, then the node closest to the root node that meets this condition is designated as node N of record R, and one of the following occurs:

1. If the record R is part of a L-structure, then the new data element is inserted into the L-structure.

Figure 4A:
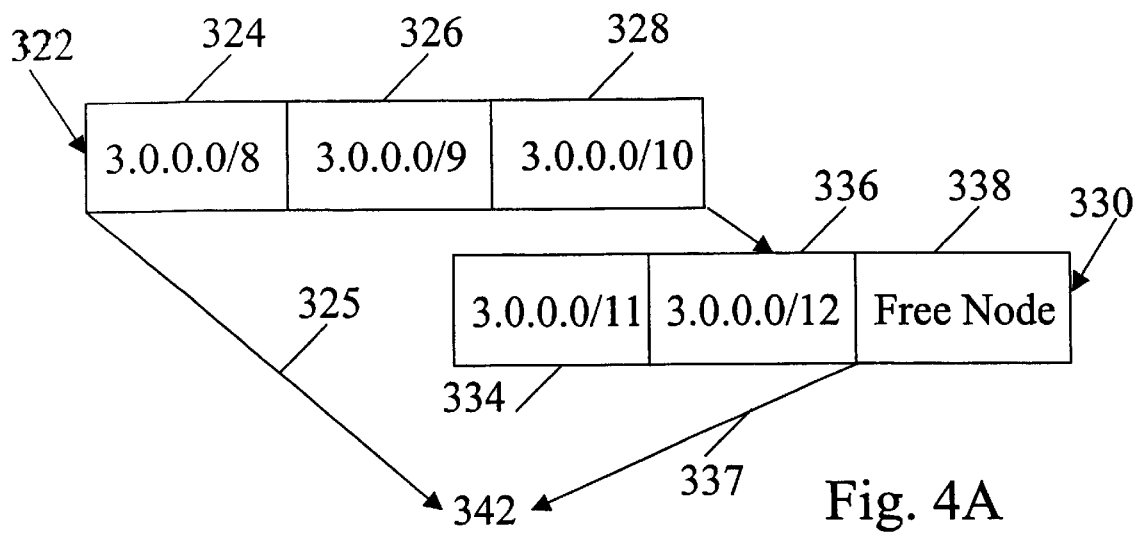
FIGS. 4A–4F show respective examples of the insertion of data elements into the tree data structure of FIG. 3.

As an example, in FIG. 4A, the data elements at node N and at the nodes following node N in the L-structure are each moved forward one node, and the new data element is inserted at the newly vacated node N. In this example, a new data element having a prefix 3.0.0.0/9 is to be inserted into the tree data structure of FIG. 3. The prefix 3.0.0.0/9 is a superset of the prefix 3.0.0.0/10 located at the node 326 of the record 322 which is part of the L-structure 320. The data elements at node 326 and to the right of node 326 within the L-structure are each advanced one node. The data element having the prefix 3.0.0.0/12 is advanced from node 334 to node 336, the data element having the prefix 3.0.0.0/11 is advanced from node 328 to node 334, and the data element having the prefix 3.0.0.0/10 is advanced from node 326 to node 328. Then, the new data element is inserted into node 326.

2. If the record R is part of the B-tree portion of the tree data structure, i.e. is not part of an L-structure, but the record R is pointed to by a pointer that originates from an L-structure, then the new data element is inserted into the L-structure.

Figure 4B:
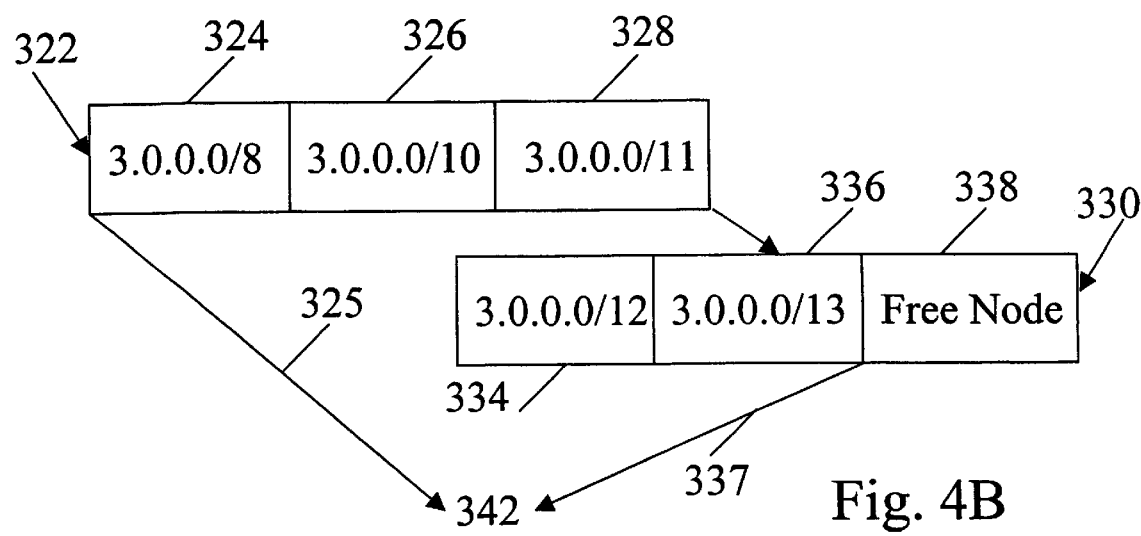

For example, in FIG. 4B, a new data element having a prefix 3.0.0.0/13 is to be inserted into the tree data structure of FIG. 3. The prefix 3.0.0.0/13 contains the prefix 3.4.0.0/16 located at the node 346 of the record 342. The record 342 is part of the B-tree portion but is pointed to by the pointer 337 from the record 330 of the L-structure 320. The new data element is thus stored at the free node 336 of the record 330.

3. If the record R is part of the B-tree portion of the tree data structure and is not pointed to by a pointer that emanates from an L-structure, then a new L-structure is created and inserted immediately preceding the record R, and the new data element is inserted into the first node of the new record of the L-structure. Any pointers that previously pointed to the record R now point to the new record of the new L-structure, the first and final pointers of the new L-structure record point to record R.

Figure 4C:
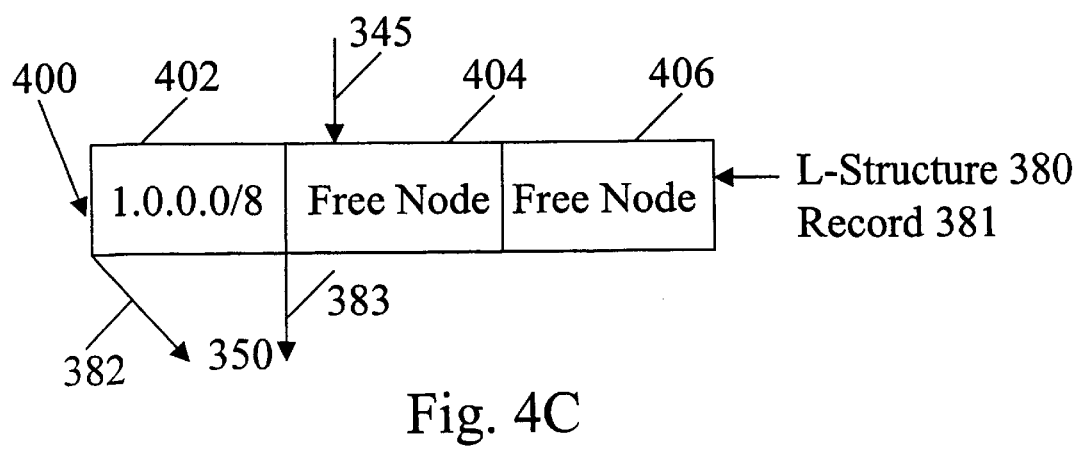

As an example, in FIG. 4C, a new data element having a prefix 1.0.0.0/8 is to be inserted into the tree data structure of FIG. 3 and contains the prefix 1.4.0.0/16 located at the node 352 of the record 350. The record 352 is part of the B-tree portion and is not pointed to by a L-structure. A new L-structure is therefore created and is comprised of new record 400. The pointer 345, which previously pointed to the record 350, now points to the record 400, and new pointers 382 and 383 now point to the record 350. The new data element is inserted into node 402 of the new L-structure record 400.

As a further alternative, if while the search is carried out, the prefix of the new data element is found to be neither identical to nor a superset of any existing element of the tree data structure, then one of the following occurs to the leaf record, designated here as R', reached by the search:

1. If the prefix stored at one of the nodes N' in the leaf record R' is a superset of the prefix P of the new data element, then the data element stored in the node N' in the leaf record R' is replaced by the new data element. The data element previously stored in the node N' in the leaf record R' is then inserted into the data structure as described above.

Figure 4D:
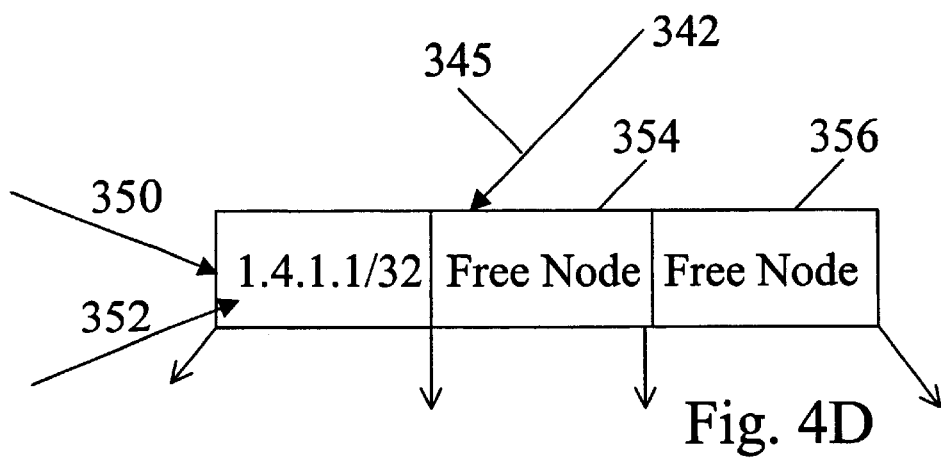
Figure 4E:
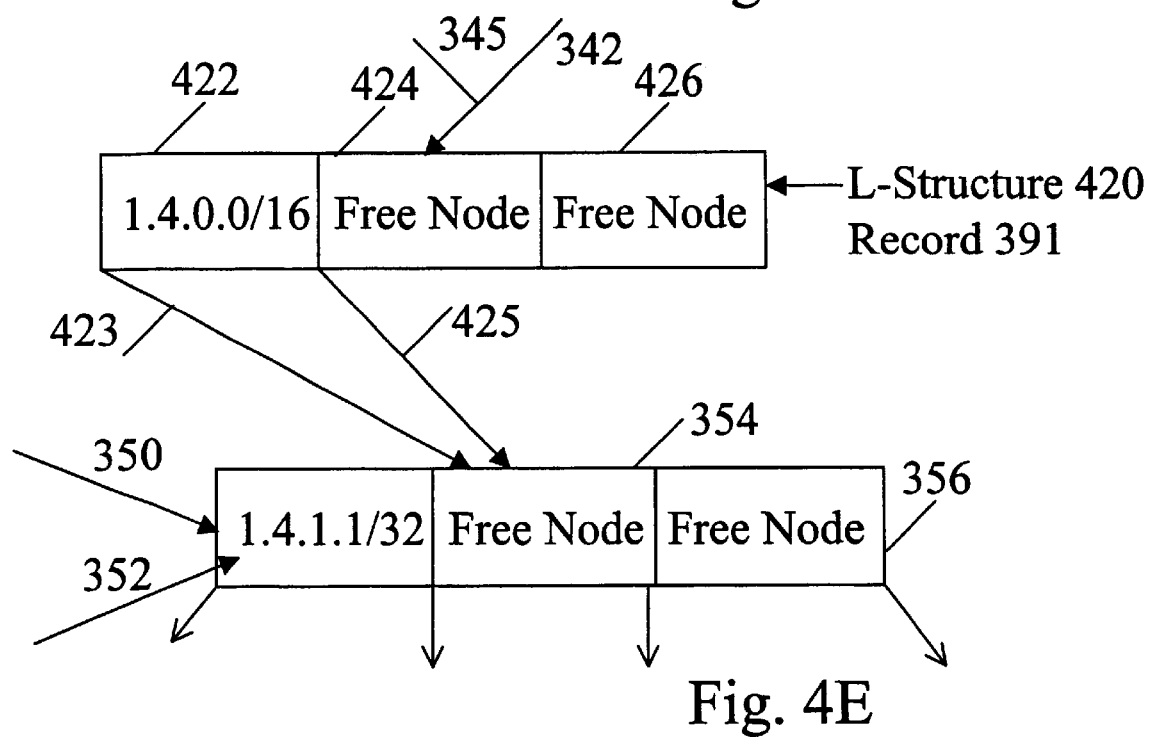

As an example, in FIGS. 4D and 4E, a new data element having a prefix 1.4.1.1/32 is to be inserted into the tree data structure of FIG. 3. The prefix 1.4.0.0/16 stored at the node 352 of the leaf record 350 is a superset of the prefix 1.4.1.1/32. A new L-structure 420 is therefore created and is comprised of a new record 391. The pointer 345, which previously pointed to the record 350, now points to the record 391, and new pointers 423 and 425 now point to the record 350. The data element at node 352 is moved to node 422 of the new record 420, and the new data element is inserted into node 352.

2. If none of the prefixes located at the nodes in the record R' is a superset of the prefix P of the new data element, then the new data element is inserted into the B-tree in a manner known in the art.

Figure 4F:
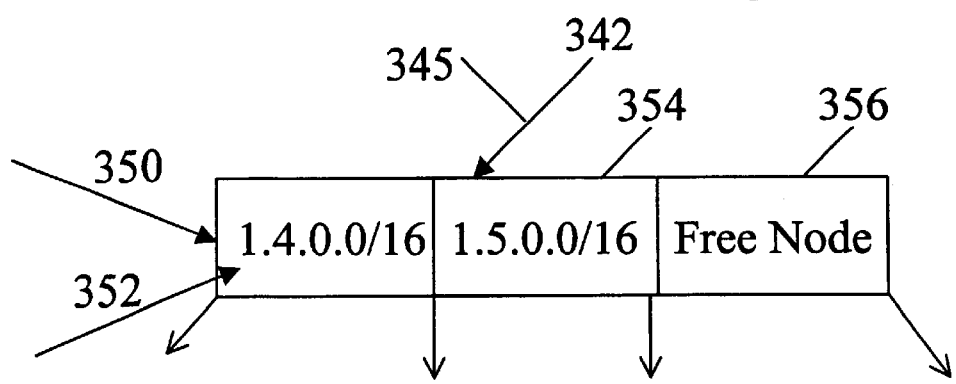

As an example, in FIG. 4F, a new data element having a prefix 1.5.0.0/16 is to be inserted into the tree data structure of FIG. 3. A search locates the prefix 1.4.0.0/16 which is located at the node 352 of the leaf record 350. The prefix 1.5.0.0/16 is not a superset of the prefix 1.4.0.0./16, and the prefix 1.4.0.0/16 is not a superset of the prefix 1.5.0.0/16. The prefix 1.5.0.0/16 is inserted into free node 354.

A data element having a prefix P is deleted from the tree data structure of the invention in the following manner:

First, a record R" whose node N" stores the data element having a prefix P is located, such as by using a best match search as described above, and one of the following occurs:

If the record R" is part of a L-structure, the data element at node N" is deleted from the L-structure.

Figure 5:
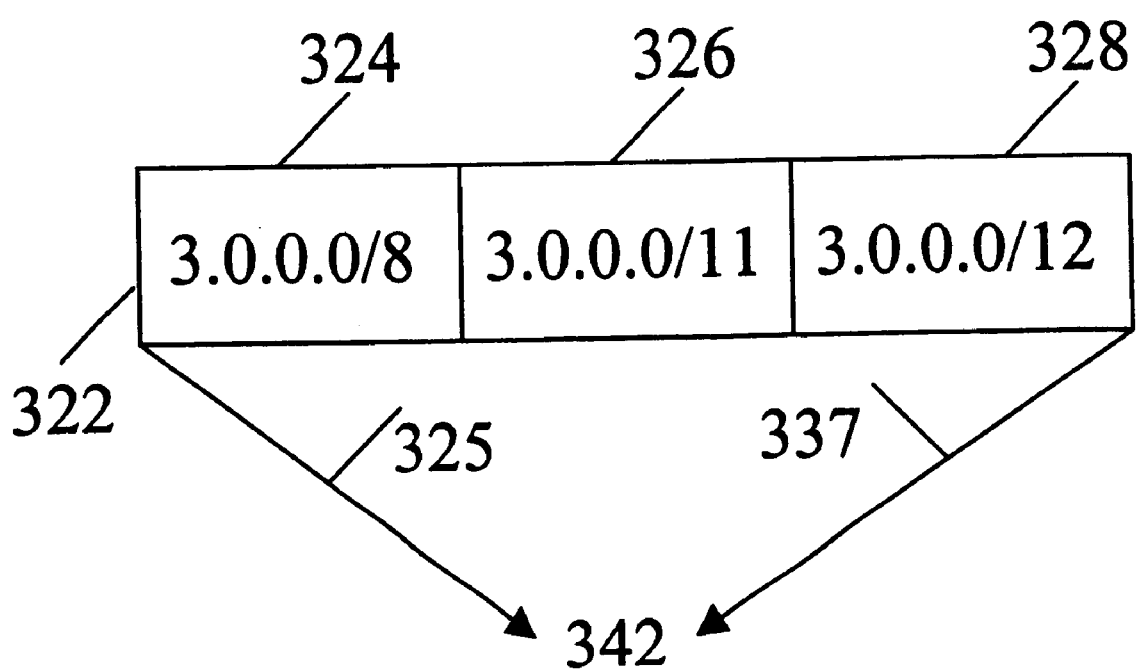
FIG. 5 shows an example of the deletion of data elements from the tree data structure of FIG. 3.

As an example, in FIG. 5, the data element at node N" is eliminated, and any data elements that are located within the L-structure in the nodes that follow node N" are moved backward one node. If the record R", or any other record in the L-structure, now consists solely of free nodes, then that record is deleted, and any pointers that previously pointed to the record will now point to the records previously pointed to by the pointers that emanated from that record. If the record R" is the only record in the L-structure and the node N" is the only node in the record R", then the entire L-structure is deleted.

Specifically, the data element having the prefix 3.0.0.0/10 and located at node 326 of record 322 is deleted from the tree data structure of FIG. 3. The record 322 is part of the L-structure 320. When the data element at node 326 is eliminated, the data elements located at nodes 328 and 334 are moved backward to nodes 326 and 328, respectively. The record 330 now consists solely of free nodes and is deleted, and the pointer 323 that previously pointed to the record 330 now points to the record 342 that was previously pointed to by the pointer 337.

If the record R" is part of the B-tree portion, the data element at node N" is removed and the B-tree portion is updated in a manner similar to that known in the art except that if any of the records in the updated part of the B-tree portion is pointed to by a pointer that originates from a record in a L-structure, then: (1) the L-structures are removed from the tree data structure if any are present, i.e. any pointers that previously pointed to the L-structure now point to records previously pointed to by the pointers that emanated from the L-structure; (2) the B-tree portion is then updated in a known manner; and (3) the data elements that were removed are reinserted into the tree data structure one at a time in the manner described above.

As an example, the data element having the prefix 3.4.0.0/16 and located at node 346 of record 342 is deleted from the tree data structure of FIG. 3. The record 342 is pointed to by pointers 325 and 337 that originate from records 322 and 330, respectively, of the L-structure 320. First, the L-structure 320 is deleted, and pointer 305, which previously pointed to the record 322 of the L-structure 320, now points to record 342. Then, the data element at node 346 is deleted by updating B-tree portion 340 in a known manner. Thereafter, the data elements previously stored in the L-structure 320 are reinserted one at a time back into the tree data structure.

As a further example, the data element having the prefix 1.4.0.0/16 and located at node 352 of record 350 is deleted from the tree data structure of FIG. 3. The record 350 is not pointed to by any pointer originating from a L-structure. Therefore, the data element at node 352 and, in turn, the record 352 are simply deleted. Further, because the record is a leaf record, no other records are affected, and thus no other L-structures need be removed.

The tree data structure of the invention provides the advantage that a longest match search is carried out quickly and efficiently. Further, because only one search path is possible for any address searched, the longest match prefix is located.

When the Q-tree structure of the invention is implemented as an IP routing table, the latency period of an IP routing algorithm is reduced which increases the IP packet throughput and the performance of the system.

Figure 6:
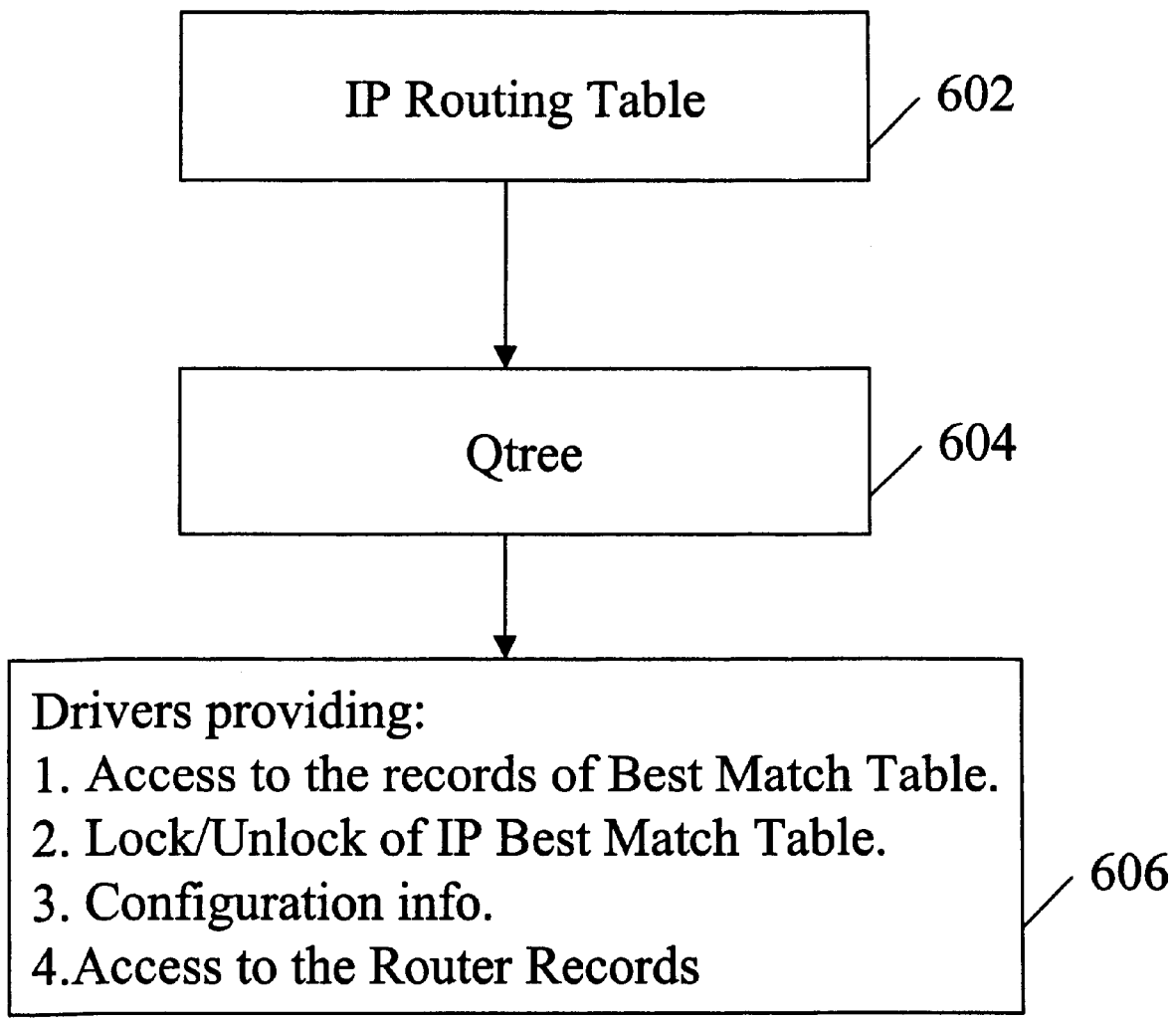
FIG. 6 shows an IP protocol implementation of the tree data structure of the invention.

FIG. 6 illustrates an example of an implementation of a Q-tree according to the invention. Here, a routing table 602 is implemented using various operations to form a Q-tree 604. The operations include getting the maximum number of entries in the table, providing read and write access to the Q-tree records according to an index, allocation and deallocation of the Q-tree records, designating a flag indicating whether a search is being carried out, assigning bits for the record indicating whether the record belongs to an L-structure and assigning primitives to prevent multiple clients from concurrently accessing the Q-tree.

Various drivers 606 provide functions including access to the records of the best matched table, locking and unlocking the best matched table, providing configuration information and providing access to router records.

The forwarding table may be implemented as a Q-tree in one of two ways. First, the entire forwarding table, including a default route, is copied into the Q-tree. However, the Q-tree will include non-forwarding entries which will increase the height of the Q-tree. Alternatively, only forwarding entries are inserted into the Q-tree, resulting in the omission of certain super-sets, such as the default route.

Although the invention has been described in relation to particular embodiments thereof, many other variations and modifications and other uses may become apparent to those skilled in the art. It is preferred, therefore, that the present invention be limited not by the specific disclosure herein, but only by the appended claims.

What is claimed is:

1. A method of inserting a new data element into a data structure comprised of a plurality of records that includes at least a root record, each of said plurality of records including at least one node and at least one pointer that points to another of said plurality of records or to a null value, said at least one node being capable of storing a respective one of a plurality of data elements, each of said plurality of data elements and said new data element including a prefix that represents at least one address value and associated data, said prefix being comprised of an address portion and a prefix length portion which defines the number of bits in said prefix, at least a portion of said data structure being arranged substantially as a balanced tree; said method comprising the steps of:

forming the data structure by merging at least one L-structure into a B-tree structure, the L-structure and the B-tree structure being formed independently of each other, the B-tree structure having non-overlapping ones of prefixes, the L-structure having overlapping ones of prefixes, the L-structure having a set in which at least one of the overlapping prefixes contains at least one of a succession of the overlapping prefixes;

locating a node in a respective one of said plurality of records having a prefix that is identical to said prefix of said new data element; and replacing associated data stored in said node of said respective one of said plurality of records with said associated data of said new data element.

2. The method of claim 1 wherein each of said plurality of records includes at most three nodes and four pointers.

3. The method of claim 1 wherein said address values are IP addresses.

4. The method of claim 1 wherein said locating step comprises the steps of:

(a) defining a current record to be said root record;

(b) starting from said node in said current record that is closest to said root node, comparing a prefix stored at each node in said current record to said prefix of said new data element until a value of said prefix stored at a respective one of said nodes in said current record exceeds or is equal to a value of said prefix of said new data element and then defining a record pointed to by a pointer immediately preceding said respective node to be said current record, or until said value of said prefix of said new data element exceeds a value of a node of said current record that is furthest from said root node and then defining a record pointed to by a pointer from said furthest node as said current record; and (c) repeating step (b) until said current record is a leaf record or until said prefix stored at said respective one of said nodes in said current record is identical with said prefix of said new data element.

5. A method of inserting a new data element into a data structure comprised of a plurality of records that includes at least a root record, each of said plurality of records including at least one node and at least one pointer that points to another of said plurality of records or to a null value, said at least one node being capable of storing a respective one of a plurality of data elements, each of said plurality of data elements and said new data element including a prefix that represents at least one address value, said prefix being comprised of an address portion and a prefix length portion which defines the number of bits in said prefix, at least a portion of said data structure being arranged substantially as a balanced tree; said method comprising the steps of:

forming the data structure by merging at least one L-structure into a B-tree structure, the L-structure and the B-tree structure being formed independently of each other, the B-tree structure having non-overlapping ones of prefixes, the L-structure having overlapping ones of prefixes, the L-structure having a set in which at least one of the overlapping prefixes contains at least one of a succession of the overlapping prefixes;

locating a node in a respective one of said plurality of records having a prefix that is contained in said prefix of said new data element and that is closest to said root record; and inserting, when said respective one of said plurality of records is included in a linked structure that is within said data structure and that is external to but linked to said balanced tree, said new data element into said linked structure.

6. The method of claim 5 wherein at least one of said plurality of data elements and said new data element includes associated data.

7. The method of claim 5 wherein each of said plurality of records includes at most three nodes and four pointers.

8. The method of claim 5 wherein said address values are IP addresses.

9. The method of claim 5 wherein said inserting step comprises the steps of: moving at least a data element stored in said node in said respective one of said plurality of records to another node in said linked structure that is one node further from said root record; and inserting said new data element into said node in said respective one of said plurality of records.

10. The method of claim 5 wherein said locating step comprises the steps of:
(a) defining a current record to be said root record;
(b) starting from said node in said current record that is closest to said root node, comparing a prefix stored at each node in said current record to said prefix of said new data element until a value of said prefix stored at a respective one of said nodes in said current record exceeds or is equal to a value of said prefix of said new data element and then defining a record pointed to by a pointer immediately preceding said respective node to be said current record, or until said value of said prefix of said new data element exceeds a value of a node of said current record that is furthest from said root node and then defining a record pointed to by a pointer from said furthest node as said current record; and
(c) repeating step (b) until said current record is a leaf record or until said prefix stored at said respective one of said nodes in said current record is identical with said prefix of said new data element.

11. The method of claim 5 wherein said linked structure is comprised of at least one record wherein a prefix stored in a first node in said at least one record contains at least another prefix stored another node in said data structure, and said first node is closer to said root record than said another node.

12. The method of claim 11 wherein a pointer that extends from a record within said balanced tree points to a location in said linked structure that is closest to said root record.

13. The method of claim 11 wherein a pointer extending from said location in said linked structure that is closest to said root record and a pointer extending from a location in said linked structure that is further from said root record each point to a further root record of a sub-portion of said balanced tree.

14. The method of claim 11 wherein, when said linked structure is comprised of at least two records, a pointer extends from a first record that is closer to said root record to a second record that is further from said root record, said pointer extending from a location within said first record that is furthest from said root record to a location within said further record that is nearest to said root record.

15. A method of inserting a new data element into a data structure comprised of a plurality of records that includes at least a root record, each of said plurality of records including at least one node and at least one pointer that points to another of said plurality of records or to a null value, said at least one node being capable of storing a respective one of a plurality of data elements, each of said plurality of data elements and said new data element including a prefix that represents at least one address value, said prefix being comprised of an address portion and a prefix length portion which defines the number of bits in said prefix, at least a portion of said data structure being arranged substantially as a balanced tree; said method comprising the steps of:

forming the data structure by merging at least one L-structure into a B-tree structure, the L-structure and the B-tree structure being formed independently of each other, the B-tree structure having non-overlapping ones of prefixes, the L-structure having overlapping ones of prefixes, the L-structure having a set in which at least one of the overlapping prefixes contains at least one of a succession of the overlapping prefixes;

locating a node in a respective one of said plurality of records having a prefix that is contained in said prefix of said new data element and that is closest to said root record; and inserting, when said respective one of said plurality of records is included in said balanced tree but is pointed to by a pointer extending from a linked structure that is within said data structure and that is external to said balanced tree, said new data element into said linked structure.

16. The method of claim 15 wherein at least one of said plurality of data elements and said new data element includes associated data.

17. The method of claim 15 wherein each of said plurality of records includes at most three nodes and four pointers.

18. The method of claim 15 wherein said address values are IP addresses.

19. The method of claim 15 wherein said locating step comprises the steps of:
(a) defining a current record to be said root record;
(b) starting from said node in said current record that is closest to said root node, comparing a prefix stored at each node in said current record to said prefix of said new data element until a value of said prefix stored at a respective one of said nodes in said current record exceeds or is equal to a value of said prefix of said new data element and then defining a record pointed to by a pointer immediately preceding said respective node to be said current record, or until said value of said prefix of said new data element exceeds a value of a node of said current record that is furthest from said root node and then defining a record pointed to by a pointer from said furthest node as said current record; and
(c) repeating step (b) said current record is a leaf record or until said prefix stored at said respective one of said nodes in said current record is identical with said prefix of said new data element.

20. The method of claim 15 wherein said linked structure is comprised of at least one record wherein a prefix stored in a first node in said at least one record contains at least another prefix stored another node in said data structure, and said first node is closer to said root record than said another node.

21. The method of claim 20 wherein a pointer that extends from a record within said balanced tree points to a location in said linked structure that is closest to said root record.

22. The method of claim 20 wherein a pointer extending from said location in said linked structure that is closest to said root record and a pointer extending from a location in said linked structure that is further from said root record each point to a further root record of a sub-portion of said balanced tree.

23. The method of claim 20 wherein, when said linked structure is comprised of at least two records, a pointer extends from a first record that is closer to said root record to a second record that is further from said root record, said pointer extending from a location within said first record that is furthest from said root record to a location within said further record that is nearest to said root record.

24. A method of inserting a new data element into a data structure comprised of a plurality of records that includes at least a root record, each of said plurality of records including at least one node and at least one pointer that points to another of said plurality of records or to a null value, said at least one node being capable of storing a respective one of a plurality of data elements, each of said plurality of data elements and said new data element including a prefix that represents at least one address value, said prefix being comprised of an address portion and a prefix length portion which defines the number of bits in said prefix, at least a portion of said data structure being arranged substantially as a balanced tree; said method comprising the steps of:

forming the data structure by merging at least one L-structure into a B-tree structure, the L-structure and the B-tree structure being formed independently of each other, the B-tree structure having non-overlapping ones of prefixes, the L-structure having overlapping ones of prefixes, the L-structure having a set in which at least one of the overlapping prefixes contains at least one of a succession of the overlapping prefixes;

locating a node in a respective one of said plurality of records having a prefix that is contained in said prefix of said new data element and that is closest to said root record;

inserting, when said respective one of said plurality of records is included in said balanced tree and is not pointed to by a pointer extending from a linked structure that is within said data structure and that is external to said balanced tree, a new linked structure at a location within said data structure that immediately precedes said respective one of said plurality of records; wherein a pointer previously pointing to said respective one of said plurality of records now points to a first record of said new linked structure, and a pointer extending from a location within said linked structure that is closest to said root record and a pointer extending from a location within said linked structure that is furthest from said root record each point to said respective one of said plurality of records; and inserting said new data element into a node nearest to said root node within said new linked structure.

25. The method of claim 24 wherein at least one of said plurality of data elements and said new data element includes associated data.

26. The method of claim 24 wherein each of said plurality of records includes at most three nodes and four pointers.

27. The method of claim 24 wherein said address values are IP addresses.

28. The method of claim 24 wherein said locating step comprises the steps of:

(a) defining a current record to be said root record;

(b) starting from said node in said current record that is closest to said root node, comparing a prefix stored at each node in said current record to said prefix of said new data element until a value of said prefix stored at a respective one of said nodes in said current record exceeds or is equal to a value of said prefix of said new data element and then defining a record pointed to by a pointer immediately preceding said respective node to be said current record, or until said value of said prefix of said new data element exceeds a value of a node of said current record that is furthest from said root node and then defining a record pointed to by a pointer from said furthest node as said current record; and (c) repeating step (b) until said current record is a leaf record or until said prefix stored at said respective one of said nodes in said current record is identical with said prefix of said new data element.

29. The method of claim 24 wherein said linked structure is comprised of at least one record wherein a prefix stored in a first node in said at least one record contains at least another prefix stored another node in said data structure, and said first node is closer to said root record than said another node.

30. The method of claim 29 wherein, when said linked structure is comprised of at least two records, a pointer extends from a first record that is closer to said root record to a second record that is further from said root record, said pointer extending from a location within said first record that is furthest from said root record to a location within said further record that is nearest to said root record.

31. A method of inserting a new data element into a data structure comprised of a plurality of records that includes at least a root record, each of said plurality of records including at least one node and at least one pointer that points to another of said plurality of records or to a null value, said at least one node being capable of storing a respective one of a plurality of data elements, each of said plurality of data elements and said new data element including a prefix that represents at least one address value, said prefix being comprised of an address portion and a prefix length portion which defines the number of bits in said prefix, at least a portion of said data structure being arranged substantially as a balanced tree; said method comprising the steps of:

forming the data structure by merging at least one L-structure into a B-tree structure, the L-structure and the B-tree structure being formed independently of each other, the B-tree structure having non-overlapping ones of prefixes, the L-structure having overlapping ones of prefixes, the L-structure having a set in which at least one of the overlapping prefixes contains at least one of a succession of the overlapping prefixes;

locating a node in a leaf record of said plurality of records having a prefix that contains said prefix of said new data element and that is closest to said root record;

replacing a data element stored in said node in said leaf record with said new data element; and inserting said data element previously stored in said node in said leaf record into said data structure.

32. The method of claim 31 wherein said replacing and inserting steps comprise the steps of:

inserting a new linked structure at a location immediately preceding said leaf record; wherein a pointer previously pointing to said respective one of said plurality of records now point to a first record of said new linked structure, and a pointer extending from a location within said linked structure is closest to said root record and a pointer extending from a location within said linked structure that is furthest from said root record each point to said leaf record;

moving a data element stored in said node in said leaf record into a node nearest to said root node within said new linked structure; and inserting said new data element into said node in said leaf record.

33. The method of claim 31 wherein at least one of said plurality of data elements and said new data element includes associated data.

34. The method of claim 31 wherein each of said plurality of records includes at most three nodes and four pointers.

35. The method of claim 31 wherein said address values are IP addresses.

36. The method of claim 31 wherein said locating step comprises the steps of:
   (a) defining a current record to be said root record;
   (b) starting from said node in said current record that is closest to said root node, comparing a prefix stored at each node in said current record to said prefix of said new data element until a value of said prefix stored at a respective one of said nodes in said current record exceeds or is equal to a value of said prefix of said new data element and then defining a record pointed to by a pointer immediately preceding said respective node to be said current record, or until said value of said prefix of said new data element exceeds a value of a node of said current record that is furthest from said root node and then defining a record pointed to by a pointer from said furthest node as said current record; and
   (c) repeating step (b) until said current record is a leaf record or until said prefix stored at said respective one of said nodes in said current record is identical with said prefix of said new data element.

37. The method of claim 31 wherein said linked structure is comprised of at least one record wherein a prefix stored in a first node in said at least one record contains at least another prefix stored another node in said data structure, and said first node is closer to said root record than said another node.

38. The method of claim 37 wherein, when said linked structure is comprised of at least two records, a pointer extends from a first record that is closer to said root record to a second record that is further from said root record, said pointer extending from a location within said first record that is furthest from said root record to a location within said further record that is nearest to said root record.

39. A method of deleting a data element from a data structure comprised of a plurality of records that includes at least a root record, each of said plurality of records including at least one node and at least one pointer that points to another of said plurality of records or to a null value, said at least one node being capable of storing a respective one of a plurality of data elements, each of said plurality of data elements and said new data element including a prefix that represents at least one address value, said prefix being comprised of an address portion and a prefix length portion which defines the number of bits in said prefix, at least a portion of said data structure being arranged substantially as a balanced tree; said method comprising the steps of:
   forming the data structure by merging at least one L-structure into a B-tree structure, the L-structure and the B-tree structure being formed independently of each other, the B-tree structure having non-overlapping ones of prefixes, the L-structure having overlapping ones of prefixes, the L-structure having a set in which at least one of the overlapping prefixes contains at least one of a succession of the overlapping prefixes;
   locating a node in a respective one of said plurality of records having said data element; and
   removing, when said respective one of said plurality of records is included in a linked structure that is within said data structure and that is external to but linked to said balanced tree, said data element from linked structure.

40. The method of claim 39 wherein said removing step comprises the steps of: removing said data element from said node in said respective one of said plurality of records; and moving at least a data element stored in said linked structure at another node in said linked structure that is one node further from said root record to said node in said respective one of said plurality of records.

41. The method of claim 39 wherein at least one of said plurality of data elements and said new data element includes associated data.

42. The method of claim 39 wherein each of said plurality of records includes at most three nodes and four pointers.

43. The method of claim 39 wherein said address values are IP addresses.

44. The method of claim 39 wherein said linked structure is comprised of at least one record wherein a prefix stored in a first node in said at least one record contains at least another prefix stored another node in said data structure, and said first node is closer to said root record than said another node.

45. The method of claim 44 wherein a pointer that extends from a record within said balanced tree points to a location in said linked structure that is closest to said root record.

46. The method of claim 44 wherein a pointer extending from said location in said linked structure that is closest to said root record and a pointer extending from a location in said linked structure that is further from said root record each point to a further root record of a sub-portion of said balanced tree.

47. The method of claim 44 wherein, when said linked structure is comprised of at least two records, a pointer extends from a first record that is closer to said root record to a second record that is further from said root record, said pointer extending from a location within said first record that is furthest from said root record to a location within said further record that is nearest to said root record.

48. A method of deleting a data element from a data structure comprised of a plurality of records that includes at least a root record, each of said plurality of records including at least one node and at least one pointer that points to another of said plurality of records or to a null value, said at least one node being capable of storing a respective one of a plurality of data elements, each of said plurality of data elements and said new data element including a prefix that represents at least one address value, said prefix being comprised of an address portion and a prefix length portion which defines the number of bits in said prefix, at least a portion of said data structure being arranged substantially as a balanced tree; said method comprising the steps of:
   forming the data structure by merging at least one L-structure into a B-tree structure, the L-structure and the B-tree structure being formed independently of each other, the B-tree structure having non-overlapping ones of prefixes, the L-structure having overlapping ones of prefixes, the L-structure having a set in which at least one of the overlapping prefixes contains at least one of a succession of the overlapping prefixes;
   locating a node in a respective one of said plurality of records having said data element;
   removing, when said respective one of said plurality of records is not included in a linked structure, any linked structure within said data structure having a pointer that points to said respective one of said plurality of records such that a pointer that previously pointed to said linked structure points to said respective one of said plurality of records;
   removing said data element from said respective one of said plurality of records and rearranging said balanced tree portion of said data structure; and reinserting into said data structure, one data element at a time, any data elements previously stored in said linked structure.

49. The method of claim 48 wherein at least one of said plurality of data elements and said new data element includes associated data.

50. The method of claim 48 wherein each of said plurality of records includes at most three nodes and four pointers.

51. The method of claim 48 wherein said address values are IP addresses.

52. The method of claim 48 wherein said linked structure is comprised of at least one record wherein a prefix stored in a first node in said at least one record contains at least another prefix stored another node in said data structure, and said first node is closer to said root record than said another node.

53. The method of claim 52 wherein a pointer that extends from a record within said balanced tree points to a location in said linked structure that is closest to said root record.

54. The method of claim 52 wherein a pointer extending from said location in said linked structure that is closest to said root record and a pointer extending from a location in said linked structure that is further from said root record each point to a further root record of a sub-portion of said balanced tree.

55. The method of claim 52 wherein, when said linked structure is comprised of at least two records, a pointer extends from a first record that is closer to said root record to a second record that is further from said root record, said pointer extending from a location within said first record that is furthest from said root record to a location within said further record that is nearest to said root record.

56. The method of claim 48 further comprising the step of removing, when said balanced tree portion of said data structure is rearranged, any further linked structures that have a pointer that points to another respective one of said plurality of records within a rearranged region of said balanced tree portion such that a pointer that previously pointed to one of said further linked structure points to said another respective one of said plurality of records, and any data elements previously stored in said one of said further linked structure are reinserted, one data element at a time, into said data structure.

57. An apparatus for inserting a new data element into a data structure comprised of at least one L-structure merged into a B-tree structure, the B-tree structure having non-overlapping ones of prefixes, the L-structure having overlapping ones of prefixes, the L-structure having a set in which at least one of the overlapping prefixes contains at least one of a succession of the overlapping prefixes; a plurality of records that includes at least a root record, each of said plurality of records including at least one node and at least one pointer that points to another of said plurality of records or to a null value, said at least one node being capable of storing a respective one of a plurality of data elements, each of said plurality of data elements and said new data element including a prefix that represents at least one address value and associated data, said prefix being comprised of an address portion and a prefix length portion which defines the number of bits in said prefix, at least a portion of said data structure being arranged substantially as a balanced tree; said apparatus comprising:

means for locating a node in a respective one of said plurality of records having a prefix that is identical to said prefix of said new data element; and means for replacing associated data stored in said node of said respective one of said plurality of records with said associated data of said new data element.

58. The apparatus of claim 57 wherein each of said plurality of records includes at most three nodes and four pointers.

59. The apparatus of claim 57 wherein said address values are IP addresses.

60. The apparatus of claim 57 wherein said means for locating comprises:

(a) means for defining a current record to be said root record;

(b) means for, starting from said node in said current record that is closest to said root node, comparing a prefix stored at each node in said current record to said prefix of said new data element until a value of said prefix stored at a respective one of said nodes in said current record exceeds or is equal to a value of said prefix of said new data element and then defining a record pointed to by a pointer immediately preceding said respective node to be said current record, or until said value of said prefix of said new data element exceeds a value of a node of said current record that is furthest from said root node and then defining a record pointed to by a pointer from said furthest node as said current record; and (c) means for repeating element (b) until said current record is a leaf record or until said prefix stored at said respective one of said nodes in said current record is identical with said prefix of said new data element.

61. An apparatus for inserting a new data element into a data structure comprised of at least one L-structure merged into a B-tree structure, the B-tree structure having non-overlapping ones of prefixes, the L-structure having overlapping ones of prefixes, the L-structure having a set in which at least one of the overlapping prefixes contains at least one of a succession of the overlapping prefixes; a plurality of records that includes at least a root record, each of said plurality of records including at least one node and at least one pointer that points to another of said plurality of records or to a null value, said at least one node being capable of storing a respective one of a plurality of data elements, each of said plurality of data elements and said new data element including a prefix that represents at least one address value, said prefix being comprised of an address portion and a prefix length portion which defines the number of bits in said prefix, at least a portion of said data structure being arranged substantially as a balanced tree; said apparatus comprising:

means for locating a node in a respective one of said plurality of records having a prefix that is contained in said prefix of said new data element and that is closest to said root record; and means for inserting, when said respective one of said plurality of records is included in a linked structure that is within said data structure and that is external to but linked to said balanced tree, said new data element in said new data structure.

62. The apparatus of claim 61 wherein said means for inserting comprises: means for moving at least a data element stored in said node in said respective one of said plurality of records to another node in said linked structure that is one node further from said root record; and means for inserting said new data element into said node in said respective one of said plurality of records.

63. The apparatus of claim 61 wherein at least one of said plurality of data elements and said new data element includes associated data.

64. The apparatus of claim 61 wherein each of said plurality of records includes at most three nodes and four pointers.

65. The apparatus of claim 61 wherein said address values are IP addresses.

66. The apparatus of claim 61 wherein said means for locating comprises:
(a) means for defining a current record to be said root record;
(b) means for, starting from said node in said current record that is closest to said root node, comparing a prefix stored at each node in said current record to said prefix of said new data element until a value of said prefix stored at a respective one of said nodes in said current record exceeds or is equal to a value of said prefix of said new data element and then defining a record pointed to by a pointer immediately preceding said respective node to be said current record, or until said value of said prefix of said new data element exceeds a value of a node of said current record that is furthest from said root node and then defining a record pointed to by a pointer from said furthest node as said current record; and
(c) means for repeating element (b) until said current record is a leaf record or until said prefix stored at said respective one of said nodes in said current record is identical with said prefix of said new data element.

67. The apparatus of claim 61 wherein said linked structure is comprised of at least one record wherein a prefix stored in a first node in said at least one record contains at least another prefix stored another node in said data structure, and said first node is closer to said root record than said another node.

68. The apparatus of claim 67 wherein a pointer that extends from a record within said balanced tree points to a location in said linked structure that is closest to said root record.

69. The apparatus of claim 67 wherein a pointer extending from said location in said linked structure that is closest to said root record and a pointer extending from a location in said linked structure that is further from said root record each point to a further root record of a sub-portion of said balanced tree.

70. The apparatus of claim 67 wherein, when said linked structure is comprised of at least two records, a pointer extends from a first record that is closer to said root record to a second record that is further from said root record, said pointer extending from a location within said first record that is furthest from said root record to a location within said further record that is nearest to said root record.

71. An apparatus for inserting a new data element into a data structure comprised of at least one L-structure merged into a B-tree structure, the B-tree structure having non-overlapping ones of prefixes, the L-structure having overlapping ones of prefixes, the L-structure having a set in which at least one of the overlapping prefixes contains at least one of a succession of the overlapping prefixes; a plurality of records that includes at least a root record, each of said plurality of records including at least one node and at least one pointer that points to another of said plurality of records or to a null value, said at least one node being capable of storing a respective one of a plurality of data elements, each of said plurality of data elements and said new data element including a prefix that represents at least one address value, said prefix being comprised of an address portion and a prefix length portion which defines the number of bits in said prefix, at least a portion of said data structure being arranged substantially as a balanced tree; said apparatus comprising:
means for locating a node in a respective one of said plurality of records having a prefix that is contained in said prefix of said new data element and that is closest to said root record; and
means for inserting, when said respective one of said plurality of records is included in said balanced tree but is pointed to by a pointer extending from a linked structure that is within said data structure and that is external to said balanced tree, said new data element into said linked structure.

72. The apparatus of claim 71 wherein at least one of said plurality of data elements and said new data element includes associated data.

73. The apparatus of claim 71 wherein each of said plurality of records includes at most three nodes and four pointers.

74. The apparatus of claim 71 wherein said address values are IP addresses.

75. The apparatus of claim 71 wherein said means for locating comprises:
(a) defining a current record to be said root record;
(b) means for, starting from said node in said current record that is closest to said root node, comparing a prefix stored at each node in said current record to said prefix of said new data element until a value of said prefix stored at a respective one of said nodes in said current record exceeds or is equal to a value of said prefix of said new data element and then defining a record pointed to by a pointer immediately preceding said respective node to be said current record, or until said value of said prefix of said new data element exceeds a value of a node of said current record that is furthest from said root node and then defining a record pointed to by a pointer from said furthest node as said current record; and
(c) means for repeating element (b) until said current record is a leaf record or until said prefix stored at said respective one of said nodes in said current record is identical with said prefix of said new data element.

76. The apparatus of claim 71 wherein said linked structure is comprised of at least one record wherein a prefix stored in a first node in said at least one record contains at least another prefix stored another node in said data structure, and said first node is closer to said root record than said another node.

77. The apparatus of claim 76 wherein a pointer that extends from a record within said balanced tree points to a location in said linked structure that is closest to said root record.

78. The apparatus of claim 76 wherein a pointer extending from said location in said linked structure that is closest to said root record and a pointer extending from a location in said linked structure that is further from said root record each point to a further root record of a sub-portion of said balanced tree.

79. The apparatus of claim 76 wherein, when said linked structure is comprised of at least two records, a pointer extends from a first record that is closer to said root record to a second record that is further from said root record, said pointer extending from a location within said first record that is furthest from said root record to a location within said further record that is nearest to said root record.

80. An apparatus for inserting a new data element into a data structure comprised of at least one L-structure merged into a B-tree structure, the B-tree structure having non-overlapping ones of prefixes, the L-structure having overlapping ones of prefixes, the L-structure having a set in which at least one of the overlapping prefixes contains at least one of a succession of the overlapping prefixes; a plurality of records that includes at least a root record, each of said plurality of records including at least one node and at least one pointer that points to another of said plurality of records or to a null value, said at least one node being capable of storing a respective one of a plurality of data elements, each of said plurality of data elements and said new data element including a prefix that represents at least one address value, said prefix being comprised of an address portion and a prefix length portion which defines the number of bits in said prefix, at least a portion of said data structure being arranged substantially as a balanced tree; said apparatus comprising:

means for locating a node in a respective one of said plurality of records having a prefix that is contained in said prefix of said new data element and that is closest to said root record; means for inserting, when said respective one of said plurality of records is included in said balanced tree and is not pointed to by a pointer extending from a linked structure that is within said data structure and that is external to said balanced tree, a new linked structure at a location within said data structure that immediately precedes said respective one of said plurality of records;

wherein a pointer previously pointing to said respective one of said plurality of records now points to a first record of said new linked structure, and a pointer extending from a location within said linked structure that is closest to said root record and a pointer extending from a location within said linked structure that is furthest from said root record each point to said respective one of said plurality of records; and means for inserting said new data element into a node nearest to said root node within said new linked structure.

81. The apparatus of claim 80 wherein at least one of said plurality of data elements and said new data element includes associated data.

82. The apparatus of claim 81 wherein each of said plurality of records includes at most three nodes and four pointers.

83. The apparatus of claim 81 wherein said address values are IP addresses.

84. The apparatus of claim 81 wherein said means for locating comprises:

(a) defining a current record to be said root record;

(b) means for, starting from said node in said current record that is closest to said root node, comparing a prefix stored at each node in said current record to said prefix of said new data element until a value of said prefix stored at a respective one of said nodes in said current record exceeds or is equal to a value of said prefix of said new data element and then defining a record pointed to by a pointer immediately preceding said respective node to be said current record, or until said value of said prefix of said new data element exceeds a value of said prefix of said current record that is furthest from said root node and then defining a record pointed to by a pointer from said furthest node as said current record; and (c) means for repeating element (b) until said current record is a leaf record or until said prefix stored at said respective one of said nodes in said current record is identical with said prefix of said new data element.

85. The apparatus of claim 81 wherein said linked structure is comprised of at least one record wherein a prefix stored in a first node in said at least one record contains at least another prefix stored another node in said data structure, and said first node is closer to said root record than said another node.

86. The apparatus of claim 85 wherein, when said linked structure is comprised of at least two records, a pointer extends from a first record that is closer to said root record to a second record that is further from said root record, said pointer extending from a location within said first record that is furthest from said root record to a location within said further record that is nearest to said root record.

87. An apparatus for inserting a new data element into a data structure comprised of at least one L-structure merged into a B-tree structure, the B-tree structure having non-overlapping ones of prefixes, the L-structure having overlapping ones of prefixes, the L-structure having a set in which at least one of the overlapping prefixes contains at least one of a succession of the overlapping prefixes; a plurality of records that includes at least a root record, each of said plurality of records including at least one node and at least one pointer that points to another of said plurality of records or to a null value, said at least one node being capable of storing a respective one of a plurality of data elements, each of said plurality of data elements and said new data element including a prefix that represents at least one address value, said prefix being comprised of an address portion and a prefix length portion which defines the number of bits in said prefix, at least a portion of said data structure being arranged substantially as a balanced tree; said apparatus comprising:

means for locating a node in a leaf record of said plurality of records having a prefix that contains said prefix of said new data element and that is closest to said root record; means for replacing a data element stored in said node in said leaf record with said new data element; and means for inserting said data element previously stored in said node in said leaf record into said data structure.

88. The method of claim 87 wherein said means for replacing and means for inserting comprise:

means for inserting a new linked structure at a location immediately preceding said leaf record; wherein a pointer previously pointing to said respective one of said plurality of records now point to a first record of said new linked structure, and a pointer extending from a location within said linked structure is closest to said root record and a pointer extending from a location within said linked structure that is furthest from said root record each point to said leaf record;

means for moving a data element stored in said node in said leaf record into a node nearest to said root node within said new linked structure; and means for inserting said new data element into said node in said leaf record.

89. The apparatus of claim 87 wherein at least one of said plurality of data elements and said new data element includes associated data.

90. The apparatus of claim 87 wherein each of said plurality of records includes at most three nodes and four pointers.

91. The apparatus of claim 87 wherein said address values are IP addresses.

92. The apparatus of claim 87 wherein said means for locating comprises:

(a) means for defining a current record to be said root record;

(b) means for, starting from said node in said current record that is closest to said root node, comparing a prefix stored at each node in said current record to said prefix of said new data element until a value of said prefix stored at a respective one of said nodes in said current record exceeds or is equal to a value of said prefix of said new data element and then defining a record pointed to by a pointer immediately preceding said respective node to be said current record, or until said value of said prefix of said new data element exceeds a value of a node of said current record that is furthest from said root node and then defining a record pointed to by a pointer from said furthest node as said current record; and (c) means for repeating element (b) until said current record is a leaf record or until said prefix stored at said respective one of said nodes in said current record is identical with said prefix of said new data element.

93. The apparatus of claim 87 wherein said linked structure is comprised of at least one record wherein a prefix stored in a first node in said at least one record contains at least another prefix stored another node in said data structure, and said first node is closer to said root record than said another node.

94. The apparatus of claim 87 wherein, when said linked structure is comprised of at least two records, a pointer extends from a first record that is closer to said root record to a second record that is further from said root record, said pointer extending from a location within said first record that is furthest from said root record to a location within said further record that is nearest to said root record.

95. An apparatus for deleting a data element from a data structure comprised of at least one L-structure merged into a B-tree structure, the B-tree structure having non-overlapping ones of prefixes, the L-structure having overlapping ones of prefixes, the L-structure having a set in which at least one of the overlapping prefixes contains at least one of a succession of the overlapping prefixes; a plurality of records that includes at least a root record, each of said plurality of records including at least one node and at least one pointer that points to another of said plurality of records or to a null value, said at least one node being capable of storing a respective one of a plurality of data elements, each of said plurality of data elements and said new data element including a prefix that represents at least one address value, said prefix being comprised of an address portion and a prefix length portion which defines the number of bits in said prefix, at least a portion of said data structure being arranged substantially as a balanced tree; said apparatus comprising:

means for locating a node in a respective one of said plurality of records having said data element; and means for removing, when said respective one of said plurality of records is included in a linked structure that is within said data structure and that is external to but linked to said balanced tree, said data element from linked structure.

96. The apparatus of claim 95 wherein said means for removing comprises:

means and removing said data element said node in said respective one of said plurality of records; and means for moving at least a data element stored in said linked structure at another node in said linked structure that is one node further from said root record to said node in said respective one of said plurality of records.

97. The apparatus of claim 95 wherein at least one of said plurality of data elements and said new data element includes associated data.

98. The apparatus of claim 95 wherein each of said plurality of records includes at most three nodes and four pointers.

99. The apparatus of claim 95 wherein said address values are IP addresses.

100. The apparatus of claim 95 wherein said linked structure is comprised of at least one record wherein a prefix stored in a first node in said at least one record contains at least another prefix stored another node in said data structure, and said first node is closer to said root record than said another node.

101. The apparatus of claim 100 wherein a pointer that extends from a record within said balanced tree points to a location in said linked structure that is closest to said root record.

102. The apparatus of claim 100 wherein a pointer extending from said location in said linked structure that is closest to said root record and a pointer extending from a location in said linked structure that is further from said root record each point to a further root record of a sub-portion of said balanced tree.

103. The apparatus of claim 100 wherein, when said linked structure is comprised of at least two records, a pointer extends from a first record that is closer to said root record to a second record that is further from said root record, said pointer extending from a location within said first record that is furthest from said root record to a location within said further record that is nearest to said root record.

104. An apparatus for deleting a data element from a data structure comprised of at least one L-structure merged into a B-tree structure, the B-tree structure having non-overlapping ones of prefixes, the L-structure having overlapping ones of prefixes, the L-structure having a set in which at least one of the overlapping prefixes contains at least one of a succession of the overlapping prefixes; a plurality of records that includes at least a root record, each of said plurality of records including at least one node and at least one pointer that points to another of said plurality of records or to a null value, said at least one node being capable of storing a respective one of a plurality of data elements, each of said plurality of data elements and said new data element including a prefix that represents at least one address value, said prefix being comprised of an address portion and a prefix length portion which defines the number of bits in said prefix, at least a portion of said data structure being arranged substantially as a balanced tree; said apparatus comprising:

means for locating a node in a respective one of said plurality of records having said data element;

means for removing, when said respective one of said plurality of records is not included in a linked structure, any linked structure within said data structure having a pointer that points to said respective one of said plurality of records such that a pointer that previously pointed to said linked structure points to said respective one of said plurality of records;

means for removing said data element from said respective one of said plurality of records and rearranging said balanced tree portion of said data structure; and means for reinserting into said data structure, one data element at a time, any data elements previously stored in said linked structure.

105. The apparatus of claim 104 wherein at least one of said plurality of data elements and said new data element includes associated data.

106. The apparatus of claim 104 wherein each of said plurality of records includes at most three nodes and four pointers.

107. The apparatus of claim 104 wherein said address values are IP addresses.

108. The apparatus of claim 104 wherein said linked structure is comprised of at least one record wherein a prefix stored in a first node in said at least one record contains at least another prefix stored another node in said data structure, and said first node is closer to said root record than said another node.

109. The apparatus of claim 104 wherein a pointer that extends from a record within said balanced tree points to a location in said linked structure that is closest to said root record.

110. The apparatus of claim 109 wherein a pointer extending from said location in said linked structure that is closest to said root record and a pointer extending from a location in said linked structure that is further from said root record each point to a further root record of a sub-portion of said balanced tree.

111. The apparatus of claim 109 wherein, when said linked structure is comprised of at least two records, a pointer extends from a first record that is closer to said root record to a second record that is further from said root record, said pointer extending from a location within said first record that is furthest from said root record to a location within said further record that is nearest to said root record.

112. The apparatus of claim 109 further comprising means for removing, when said balanced tree portion of said data structure is rearranged, any further linked structures that have a pointer that points to another respective one of said plurality of records within a rearranged region of said balanced tree portion such that a pointer that previously pointed to one of said further linked structure points to said another respective one of said plurality of records, and any data elements previously stored in said one of said further linked structure are reinserted, one data element at a time, into said data structure.

113. A method of searching for a data element in a data structure comprised of a plurality of records that includes at least a root record, each of said plurality of records including at least one node and at least one pointer that points to another of said plurality of records or to a null value, said at least one node being capable of storing a respective one of a plurality of data elements, each of said plurality of data elements including a prefix that represents at least one address value, said prefix being comprised of an address portion and a prefix length portion which defines the number of bits in said prefix, at least a portion of said data structure being arranged substantially as a balanced tree; said method comprising the steps of:

forming the data structure by merging at least one L-structure into a B-tree structure, the L-structure and the B-tree structure being formed independently of each other, the B-tree structure having non-overlapping ones of prefixes, the L-structure having overlapping ones of prefixes, the L-structure having a set in which at least one of the overlapping prefixes contains at least one of a succession of the overlapping prefixes;

locating a respective one of said plurality of nodes that stores a data element having a prefix that is a best match to said prefix of said data element, said best match being a prefix that represents at least an address value that includes said address portion of said data element and having a maximum length among any other prefixes stored in said data structure that represent at least an address value that includes said address portion of said data element.

114. The method claim 113 wherein said data structure includes at least one linked structure.

115. The method of claim 114 wherein said linked structure is comprised of at least one record wherein a prefix stored in a first node in said at least one record contains at least another prefix stored another node in said data structure, and said first node is closer to said root record than said another node.

116. The method of claim 114 wherein a pointer that extends from a record within said balanced tree points to a location in said linked structure that is closest to said root record.

117. The method of claim 114 wherein a pointer extending from said location in said linked structure that is closest to said root record and a pointer extending from a location in said linked structure that is further from said root record each point to a further root record of a sub-portion of said balanced tree.

118. The method of claim 114 wherein, when said linked structure is comprised of at least two records, a pointer extends from a first record that is closer to said root record to a second record that is further from said root record, said pointer extending from a location within said first record that is furthest from said root record to a location within said further record that is nearest to said root record.

119. A method of searching for a data element in a data structure comprised of a plurality of records that includes at least a root record, each of said plurality of records including at least one node and at least one pointer that points to another of said plurality of records or to a null value, said at least one node being capable of storing a respective one of a plurality of data elements, each of said plurality of data elements including a prefix that represents at least one address value, said prefix being comprised of an address portion and a prefix length portion which defines the number of bits in said prefix, at least a portion of said data structure being arranged substantially as a balanced tree; said method comprising the steps of:

(a) forming the data structure by merging at least one L-structure into a B-tree structure, the L-structure and the B-tree structure being formed independently of each other, the B-tree structure having non-overlapping ones of prefixes, the L-structure having overlapping ones of prefixes, the L-structure having a set in which at least one of the overlapping prefixes contains at least one of a succession of the overlapping prefixes;

(b) defining a current record to be said root record and defining a best match node to be a default node;

(c) starting from a node in said current record that is closest to said root node, comparing a prefix stored at each node in said current record to said prefix of said data element, and when a prefix stored at a respective one of said nodes in said current record contains said prefix of said data element and when a prefix length stored at said respective one of said nodes in said current record is greater than said prefix stored at said best match node, redefining said best match node to be respective one of said nodes in said current record;

(d) starting from said node in said current record that is closest to said root node, comparing a prefix stored at each node in said current record to said prefix of said data element until a value of said prefix stored at a respective one of said nodes in said current record exceeds or is equal to a value of said prefix of said data element and then defining a record pointed to by a pointer corresponding to said respective node to be said current record, or until said value of said prefix of said data element exceeds a value of a node of said current record that is furthest from said root node and then defining a record pointed to by a pointer from said furthest node as said current record; and (e) repeating steps (c) and (d) until said current record is a leaf record or until said prefix of said data element is identical to said prefix stored at said respective one of said nodes.

120. The method claim 119 wherein said data structure includes at least one linked structure.

121. The method of claim 120 wherein said linked structure is comprised of at least one record wherein a prefix stored in a first node in said at least one record contains at least another prefix stored another node in said data structure, and said first node is closer to said root record than said another node.

122. The method of claim 120 wherein a pointer that extends from a record within said balanced tree points to a location in said linked structure that is closest to said root record.

123. The method of claim 120 wherein a pointer extending from said location in said linked structure that is closest to said root record and a pointer extending from a location in said linked structure that is further from said root record each point to a further root record of a sub-portion of said balanced tree.

124. The method of claim 120 wherein, when said linked structure is comprised of at least two records, a pointer extends from a first record that is closer to said root record to a second record that is further from said root record, said pointer extending from a location within said first record that is farthest from said root record to a location within said further record that is nearest to said root record.

125. An apparatus for searching for a data element in a data structure comprised of forming the data structure by merging at least one L-structure into a B-tree structure, the L-structure and the B-tree structure being formed independently of each other, the B-tree structure having non-overlapping ones of prefixes, the L-structure having overlapping ones of prefixes, the L-structure having a set in which at least one of the overlapping prefixes contains at least one of a succession of the overlapping prefixes; a plurality of records that includes at least a root record, each of said plurality of records including at least one node and at least one pointer that points to another of said plurality of records or to a null value, said at least one node being capable of storing a respective one of a plurality of data elements, each of said plurality of data elements including a prefix that represents at least one address value, said prefix being comprised of an address portion and a prefix length portion which defines the number of bits in said prefix, at least a portion of said data structure being arranged substantially as a balanced tree; said apparatus comprising:

means for locating a respective one of said plurality of nodes that stores a data element having a prefix that is a best match to said prefix of said data element, said best match being a prefix that represents at least an address value that includes said address portion of said data element and having a maximum length among any other prefixes stored in said data structure that represent at least an address value that includes said address portion of said data element.

126. The apparatus of claim 125 said data structure includes at least one linked structure.

127. The apparatus of claim 126 wherein said linked structure is comprised of at least one record wherein a prefix stored in a first node in said at least one record contains at least another prefix stored another node in said data structure, and said first node is closer to said root record than said another node.

128. The apparatus of claim 126 wherein a pointer that extends from a record within said balanced tree points to a location in said linked structure that is closest to said root record.

129. The apparatus of claim 126 wherein a pointer extending from said location in said linked structure that is closest to said root record and a pointer extending from a location in said linked structure that is further from said root record each point to a further root record of a sub-portion of said balanced tree.

130. The apparatus of claim 126 wherein, when said linked structure is comprised of at least two records, a pointer extends from a first record that is closer to said root record to a second record that is further from said root record, said pointer extending from a location within said first record that is furthest from said root record to a location within said further record that is nearest to said root record.

131. An apparatus for searching for a data element in a data structure comprised of at least one L-structure merged into a B-tree structure, the B-tree structure having non-overlapping ones of prefixes, the L-structure having overlapping ones of prefixes, the L-structure having a set in which at least one of the overlapping prefixes contains at least one of a succession of the overlapping prefixes, a plurality of records that includes at least a root record, each of said plurality of records including at least one node and at least one pointer that points to another of said plurality of records or to a null value, said at least one node being capable of storing a respective one of a plurality of data elements, each of said plurality of data elements including a prefix that represents at least one address value, said prefix being comprised of an address portion and a prefix length portion which defines the number of bits in said prefix, at least a portion of said-data structure being arranged substantially as a balanced tree; said apparatus comprising:

(a) means for defining a current record to be said root record and defining a best match node to be a default node;

(b) means for, starting from a node in said current record that is closest to said root node, comparing a prefix stored at each node in said current record to said prefix of said data element, and when a prefix stored at a respective one of said nodes in said current record contains said prefix of said data element and when a prefix length stored at said respective one of said nodes in said current record is greater than said prefix stored at said best match node, redefining said best match node to be respective one of said nodes in said current record;

(c) means for, starting from said node in said current record that is closest to said root node, comparing a prefix stored at each node in said current record to said prefix of said data element until a value of said prefix stored at a respective one of said nodes in said current record exceeds or is equal to a value of said prefix of said data element and then defining a record pointed to by a pointer corresponding to said respective node to be said current record, or until said value of said prefix of said data element exceeds a value of a node of said current record that is furthest from said root node and then defining a record pointed to by a pointer from said furthest node as said current record; and (d) means for repeating elements (b) and (c) until said current record is a root record or until said prefix of said data element is identical to said prefix stored at said respective one of said plurality of nodes.

132. The apparatus of claim 131 said data structure includes at least one linked structure.

133. The apparatus of claim 132 wherein said linked structure is comprised of at least one record wherein a prefix stored in a first node in said at least one record contains at least another prefix stored another node in said data structure, and said first node is closer to said root record than said another node.

134. The apparatus of claim 132 wherein a pointer that extends from a record within said balanced tree points to a location in said linked structure that is closest to said root record.

135. The apparatus of claim 132 wherein a pointer extending from said location in said linked structure that is closest to said root record and a pointer extending from a location in said linked structure that is further from said root record each point to a further root record of a sub-portion of said balanced tree.

136. An apparatus for searching for a data element in a data structure comprised of at least one L-structure merged into a B-tree structure, the B-tree structure having non-overlapping ones of prefixes, the L-structure having overlapping ones of prefixes, the L-structure having a set in which at least one of the overlapping prefixes contains at least one of a succession of the overlapping prefixes; a plurality of records that includes at least a root record, each of said plurality of records including at least one node and at least one pointer that points to another of said plurality of records or to a null value, said at least one node being capable of storing a respective one of a plurality of data elements, each of said plurality of data elements including a prefix that represents at least one address value, said prefix being comprised of an address portion and a prefix length portion which defines the number of bits in said prefix, at least a portion of said data structure being arranged substantially as a balanced tree; said apparatus comprising:

(a) means for defining a current record to be said root record and defining a best match node to be a default node;

(b) means for, starting from a node in said current record that is closest to said root node, comparing a prefix stored at each node in said current record to said prefix of said data element, and when a prefix stored at a respective one of said nodes in said current record contains said prefix of said data element and when a prefix length stored at said respective one of said nodes in said current record is greater than said prefix stored at said best match node, redefining said best match node to be respective one of said nodes in said current record;

(c) means for, starting from said node in said current record that is closest to said root node, comparing a prefix stored at each node in said current record to said prefix of said data element until a value of said prefix stored at a respective one of said nodes in said current record exceeds or is equal to a value of said prefix of said data element and then defining a record pointed to by a pointer corresponding to said respective node to be said current record, or until said value of said prefix of said data element exceeds a value of a node of said current record that is furthest from said root node and then defining a record pointed to by a pointer from said furthest node as said current record; and (d) means for repeating elements (b) and (c) until said current record is a root record or until said prefix of said data element is identical to said prefix stored at said respective one of said plurality of nodes.

137. An apparatus that supports a longest match search for a desired address, comprising:

a quaternary tree data structure that includes
a B-tree structure that is kept balanced and stores data having non-overlapping prefixes, the B-tree structure having sub-trees that contain a plurality of records one of which being a root record, each of the records including at least one node and at least one pointer, the node storing a respective data element that includes one of the mom-overlapping prefixes and associated data, each of the records having a plurality of branches that terminate in a leaf; and a plurality of L-structures having further records that store data having overlapping prefixes, the plurality of L-structures being inserted into the B-tree structure, each of the L-structures comprising a set in which at least one of the overlapping prefixes contains at least one of a succession of the overlapping prefixes, the L-structure having a further pointer that originates from a final record of the L-structure and points to the root record of the one of the sub-trees of the B-tree structure, the at least one pointer of one of the records of the B-tree structure pointing to a first one of the further records of the L-structure.

* * * * *